United States Patent
Gustafson et al.

(10) Patent No.: US 11,560,797 B2
(45) Date of Patent: Jan. 24, 2023

(54) ENDWALL CONTOURING FOR A CONICAL ENDWALL

(71) Applicant: Siemens Energy Global GmbH & Co. KG, Munich (DE)

(72) Inventors: Ross Gustafson, Charlotte, NC (US); Li Shing Wong, Oviedo, FL (US); Farzad Taremi, Palm Beach Gardens, FL (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/040,167

(22) PCT Filed: Mar. 30, 2018

(86) PCT No.: PCT/US2018/025310
§ 371 (c)(1),
(2) Date: Sep. 22, 2020

(87) PCT Pub. No.: WO2019/190540
PCT Pub. Date: Oct. 3, 2019

(65) Prior Publication Data
US 2021/0115798 A1    Apr. 22, 2021

(51) Int. Cl.
*F01D 5/14* (2006.01)

(52) U.S. Cl.
CPC .......... *F01D 5/145* (2013.01); *F05D 2220/32* (2013.01); *F05D 2240/303* (2013.01); *F05D 2240/304* (2013.01)

(58) Field of Classification Search
CPC ................ F01D 5/145; F05D 2220/32; F05D 2240/303; F05D 2240/304
See application file for complete search history.

(56) References Cited

U.S. PATENT DOCUMENTS

| 4,677,828 A | * | 7/1987 | Matthews | F04D 29/541 |
| | | | | 60/751 |
| 6,017,186 A | * | 1/2000 | Hoeger | F04D 29/321 |
| | | | | 415/181 |

(Continued)

FOREIGN PATENT DOCUMENTS

| EP | 2642075 A2 | 9/2013 |
| EP | 3045662 A1 | 7/2016 |

OTHER PUBLICATIONS

PCT International Search Report and Written Opinion of International Searching Authority dated Oct. 15, 2018 corresponding to PCT International Application No. PCT/US2018/025310 filed Mar. 30, 2018.

*Primary Examiner* — Igor Kershteyn
*Assistant Examiner* — Theodore C Ribadeneyra

(57) ABSTRACT

A turbine stage includes an array of airfoils spaced apart circumferentially to define a flow passage therebetween for channeling a working medium. The airfoils extend radially outward from an inner endwall located at a hub side thereof. The inner endwall is inclined at an angle to an engine axis such that the flow passage is divergent from an upstream side to a downstream side. The inner endwall is non-axisymmetric about the engine axis, having a mid-passage bulge located between circumferentially adjacent first and second airfoils. The bulge has a peak at a position between 20-60% $Cax_{ID}$ and at a position between 30-70% $pitch_{ID}$.

12 Claims, 3 Drawing Sheets

(56) References Cited

U.S. PATENT DOCUMENTS

| | | | |
|---|---|---|---|
| 6,126,394 A * | 10/2000 | Matsuda | F01D 5/142 |
| | | | 415/192 |
| 6,213,711 B1 * | 4/2001 | Muller | F01D 5/145 |
| | | | 415/191 |
| 6,705,834 B1 * | 3/2004 | Jacobsson | F01D 5/143 |
| | | | 415/193 |
| 7,887,297 B2 | 2/2011 | Allen-Bradley et al. | |
| 8,313,291 B2 * | 11/2012 | Mariotti | F01D 9/041 |
| | | | 415/210.1 |
| 8,439,643 B2 * | 5/2013 | Kuhne | F01D 5/20 |
| | | | 416/193 A |
| 8,459,956 B2 | 6/2013 | Pandey et al. | |
| 8,591,184 B2 * | 11/2013 | Siden | F01D 5/143 |
| | | | 415/207 |
| 9,194,235 B2 * | 11/2015 | Wunderer | F01D 5/143 |
| 9,512,727 B2 * | 12/2016 | Johann | F01D 5/34 |
| 9,822,795 B2 * | 11/2017 | Johann | F04D 29/547 |
| 9,879,540 B2 * | 1/2018 | Li | F01D 9/04 |
| 10,161,255 B2 * | 12/2018 | Brozyna | F01D 5/145 |
| 10,221,710 B2 * | 3/2019 | Winn | F01D 9/041 |
| 10,415,392 B2 * | 9/2019 | Lohaus | F01D 5/14 |
| 10,689,993 B2 * | 6/2020 | Pierre | F01D 5/141 |
| 10,968,748 B2 * | 4/2021 | Ramirez | F01D 5/143 |
| 2006/0024158 A1 * | 2/2006 | Hoeger | F01D 9/02 |
| | | | 415/182.1 |
| 2007/0154316 A1 * | 7/2007 | Clarke | F01D 5/141 |
| | | | 416/223 R |
| 2007/0183898 A1 * | 8/2007 | Hurst | F01D 5/141 |
| | | | 416/223 R |
| 2007/0258810 A1 * | 11/2007 | Aotsuka | F01D 5/143 |
| | | | 415/206 |
| 2007/0258818 A1 * | 11/2007 | Allen-Bradley | F01D 5/143 |
| | | | 416/193 A |
| 2010/0143139 A1 * | 6/2010 | Pandey | F01D 5/143 |
| | | | 416/179 |
| 2010/0166558 A1 * | 7/2010 | Siden | F01D 5/143 |
| | | | 416/193 R |
| 2010/0303627 A1 * | 12/2010 | Megerle | F01D 5/145 |
| | | | 416/179 |
| 2012/0201692 A1 * | 8/2012 | Boston | F04D 29/321 |
| | | | 416/242 |
| 2013/0017095 A1 * | 1/2013 | Lee | F01D 5/141 |
| | | | 416/239 |
| 2013/0108433 A1 * | 5/2013 | Green | F01D 5/143 |
| | | | 415/208.2 |
| 2014/0142898 A1 * | 5/2014 | Nanda | F01D 25/30 |
| | | | 703/1 |
| 2014/0348660 A1 * | 11/2014 | Guendogdu | F01D 5/145 |
| | | | 416/242 |
| 2015/0044038 A1 * | 2/2015 | Gier | F01D 9/02 |
| | | | 415/192 |
| 2015/0204201 A1 * | 7/2015 | Turner | F01D 5/145 |
| | | | 416/179 |
| 2016/0146601 A1 * | 5/2016 | Chuong | G01B 21/28 |
| | | | 702/156 |
| 2017/0074101 A1 | 3/2017 | Takahashi et al. | |
| 2017/0130596 A1 * | 5/2017 | Bhaumik | F01D 25/24 |
| 2017/0226877 A1 * | 8/2017 | Bielek | F01D 5/141 |
| 2018/0179901 A1 * | 6/2018 | Martin, Jr. | F01D 5/28 |
| 2018/0328184 A1 * | 11/2018 | Brettschneider | F01D 5/142 |
| 2019/0120059 A1 * | 4/2019 | Nash | F01D 5/143 |
| 2021/0254546 A1 * | 8/2021 | Kimura | F02C 3/04 |

* cited by examiner

ENDWALL CONTOURING FOR A CONICAL ENDWALL

BACKGROUND

1. Field

The present invention relates to gas turbine engines, and in particular, to airfoil arrays used in a gas turbine engine. Specific embodiments disclosed herein relate to an airfoil array having a non-axisymmetric endwall for reducing secondary flow losses.

2. Description of the Related Art

In a turbomachine, such as a gas turbine engine, air is pressurized in a compressor section and then mixed with fuel and burned in a combustor section to generate hot combustion gases. The working medium, comprising hot combustion gases is expanded within a turbine section of the engine where energy is extracted to power the compressor section and to produce useful work, such as turning a generator to produce electricity. The working medium travels through a series of turbine stages within the turbine section. A turbine stage may include a row of stationary vanes, followed by a row of rotating blades, where the blades extract energy from the hot combustion gases for providing output.

Each rotating blade typically includes an attachment adapted to fit in one of the slots, a platform and an airfoil. When the blades are installed in the hub the platforms cooperate with each other to partially define the radially inner boundary of an annular working medium flowpath. The airfoils span across the flowpath so that the airfoil tips are in close proximity to a stationary component, such as a turbine ring segment. The ring segment circumscribes the blade array to partially define the radially outer boundary of the flowpath. Alternatively, a blade may have a radially outer platform or shroud that partially defines the radially outer boundary of the flowpath. The radially inner platform and the radially outer platform (if present) define flowpath endwalls.

Each stationary vane typically has radially inner and outer platforms that partially define the radially inner and outer flowpath boundaries. An airfoil spans across the flowpath from the inner platform to the outer platform. The radially inner and outer platforms of the vanes also define flowpath endwalls.

During engine operation, a stream of working medium fluid flows through the turbine flowpath. Near the endwalls, the fluid flow is dominated by a vortical flow structure known as a horseshoe vortex. The vortex forms as a result of the endwall boundary layer which separates from the endwall as the fluid approaches the airfoils. The separated fluid reorganizes into the horseshoe vortex. There is a high loss of efficiency associated with the vortex. The loss is referred to as "secondary" or "endwall" loss.

To address secondary losses, it is known to provide a non-axisymmetric contoured surface to the blade and vane endwalls. Currently, endwall contouring surfaces have been primarily investigated on cylindrical endwalls.

SUMMARY

Briefly, aspects of the present invention relate to non-axisymmetric endwall contouring for conical endwalls.

According to an aspect of the present invention a turbine stage is provided. The turbine stage comprises an array of airfoils spaced apart circumferentially to define a flow passage therebetween for channeling a working medium. The airfoils extend radially outward from an inner endwall located at a hub side thereof. In the turbine stage, an axial position 0% $Cax_{ID}$ is defined as a leading edge position of the airfoils on the inner endwall in an axial direction of the stage, and an axial position 100% $Cax_{ID}$ is defined as a trailing edge position of the airfoils on the inner endwall in the axial direction of the stage from an upstream side to a downstream side. Also, at any axial position in the turbine stage, 0% $pitch_{ID}$ is defined as a first position on the inner endwall at a pressure side surface of a first airfoil of the array, and 100% $pitch_{ID}$ is defined as a second position on the inner endwall at a suction side surface of a circumferentially adjacent second airfoil of the array, which faces the first position at the pressure side surface of the first airfoil in a circumferential direction of the stage. The inner endwall is inclined at an angle to an engine axis such that the flow passage is divergent from the upstream side to the downstream side. The inner endwall is non-axisymmetric about the engine axis, comprising a mid-passage bulge located between the first and second airfoils. The bulge has a peak at a position between 20-60% $Cax_{ID}$ and at a position between 30-70% $pitch_{ID}$.

BRIEF DESCRIPTION OF THE DRAWINGS

The invention is shown in more detail by help of figures. The figures show specific configurations and do not limit the scope of the invention.

DETAILED DESCRIPTION

In the following detailed description of the preferred embodiment, reference is made to the accompanying drawings that form a part hereof, and in which is shown by way of illustration, and not by way of limitation, a specific embodiment in which the invention may be practiced. It is to be understood that other embodiments may be utilized and that changes may be made without departing from the spirit and scope of the present invention.

In the description and drawings, the directional axes A, R and C respectively denote an axial direction, a radial direction and a circumferential direction of a gas turbine engine.

In the description and the claims, a range is understood to include the stated boundary values. For example, the phrase "between X-Y" is understood to include the values of X and Y.

Figure 1:
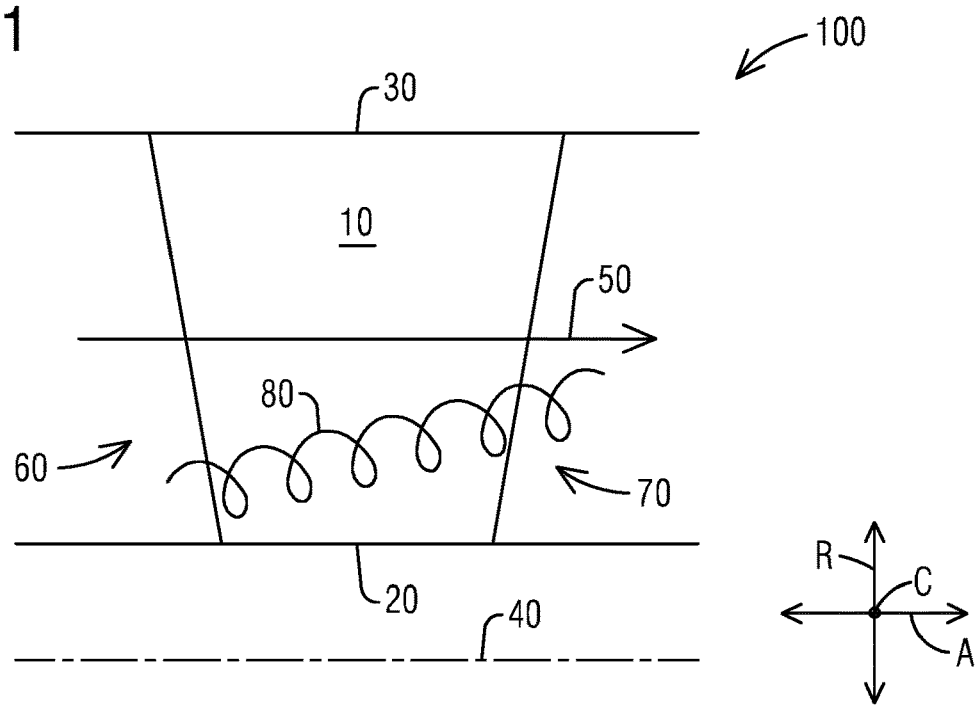
FIG. 1 is a schematic longitudinal side view of a portion of a turbine stage having cylindrical endwalls.

FIG. 1 schematically illustrates a portion of a known type of turbine stage 100 comprising a row of vanes. As shown, the row of vanes comprises an array of airfoils 10 extending between a circumferential cascade of platforms located at a hub side defining an inner endwall 20 and a circumferential cascade of platforms located at a tip side defining an outer endwall 30. The inner endwall 20 and the outer endwall 30 respectively define an inner diameter boundary and an outer diameter boundary of a flow passage 50 of a working medium between circumferentially adjacent airfoils 10. In the configuration shown in FIG. 1, both of the endwalls 20, 30 have cylindrical nominal surfaces, which are parallel to an engine axis 40.

During engine operation, a stream of working medium fluid flows through the flow passage 50. Near the endwalls, the fluid flow is dominated by a vortical flow structure known as a horseshoe vortex. The vortex may form as a result of the endwall boundary layer which separates from the endwall as the fluid approaches the airfoils 10, leading to a loss in aerodynamic efficiency. In FIG. 1, an example of such a vortex 80 is schematically shown at the inner endwall 20, it being understood that vortical structures are typically also formed at the outer endwall 30. The losses resulting from the vortex may be addressed by providing a non-axisymmetric contouring to the endwall, comprising, for example a hill or a bulge typically adjacent to a pressure side surface of the airfoils 10.

Figure 2:
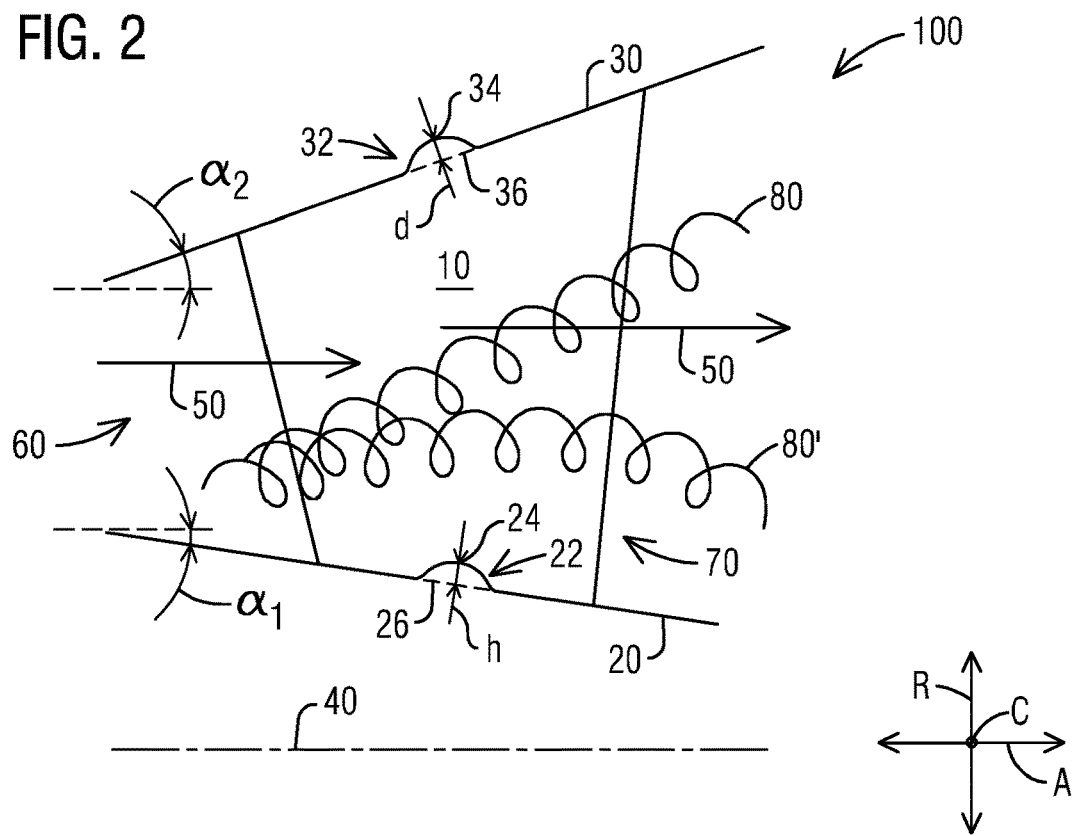
FIG. 2 is an exaggerated schematic longitudinal side view of a portion of a turbine stage having conical endwalls, wherein aspects of the present invention may be applied.

FIG. 2 schematically illustrates a portion of a turbine stage 100 comprising a row of vanes having conical endwalls 20, 30, wherein aspects of the present invention may be implemented. Similar to the example of FIG. 1, an array of airfoils 10 extend between a circumferential cascade of platforms located at a hub side defining an inner endwall 20 and a circumferential cascade of platforms located at a tip side defining an outer endwall 30. The inner endwall 20 and the outer endwall 30 respectively define an inner diameter boundary and an outer diameter boundary of a flow passage 50 of a working medium between circumferentially adjacent airfoils 10. However, in the illustrated embodiment, both the endwalls 20, 30 (or at least the inner endwall 20) are inclined with respect to the engine axis 40. The angles of inclination of the inner endwall 20 and the outer endwall 30 in relation to the engine axis 40 are designated as $\alpha_1$ and $\alpha_2$ respectively. In particular, as shown, in the present example, the inner endwall 20 is inclined toward the engine axis 40 in a direction from an upstream side 60 to a downstream side 70 with respect to a flow of the working medium. The outer endwall 30 is inclined away from the engine axis 40 in a direction from the upstream side 60 to the downstream side 70. Consequently, the endwalls 20 and 30 have respective axis-symmetric nominal surfaces 26, 36 that are conical, i.e., forming portion of a cone, such that the flow passage 50 between adjacent airfoils 10 is divergent between the upstream side 60 and the downstream side 70. The angle $\alpha_1$ may lie, for example, in the range between 5-25 degrees while the angle $\alpha_2$ may lie, for example, in the range between 10-45 degrees. In the shown embodiment, the angle $\alpha_1$ of inclination of the inner endwall 20 is shallower than the angle $\alpha_2$ of inclination of the outer endwall 30.

The present inventors have recognized that in a conical divergent endwall geometry, such as in the example of FIG. 2, the passage vortex tends to lift off the endwall quickly and ends at a higher span (i.e., larger distance from the endwall) than with a cylindrical endwall, thus leading to higher secondary losses. This effect is schematically illustrated in FIG. 2, wherein a vortex 80 is shown to be formed at the conical inner endwall 20, which ends at a higher span than the corresponding vortex 80 formed at the cylindrical inner endwall 20 shown in FIG. 1. Though not shown in the drawings, a corresponding effect may also be observed at the conical outer endwall 30.

The present inventors have devised improved non-axisymmetric endwall shapes that address at least the above noted technical problems applicable for a conical divergent endwall.

Figure 3:
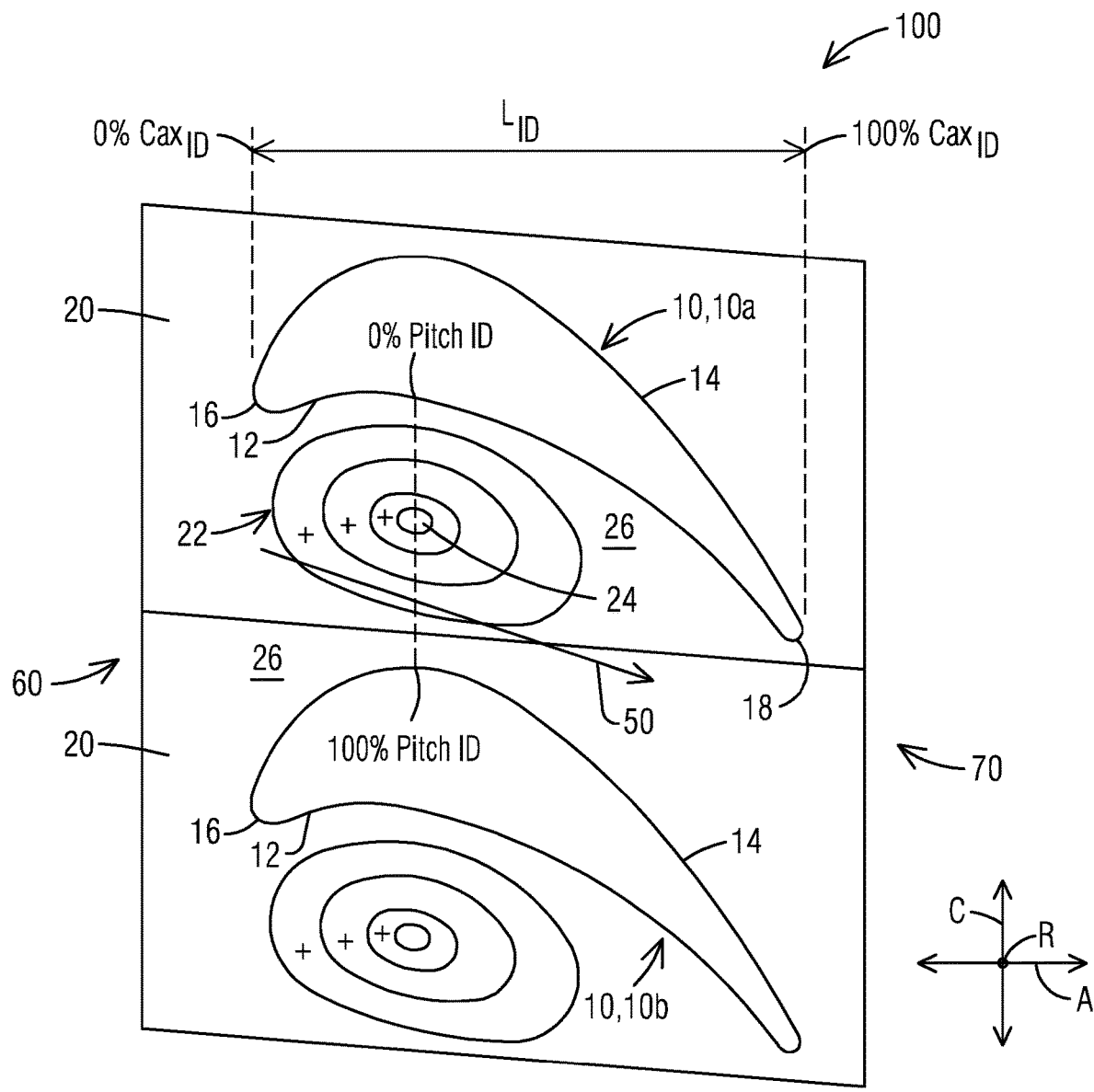
FIG. 3 illustrates a topography of a contoured conical inner endwall according to one embodiment of the invention.

An example embodiment of the present invention is illustrated referring to FIG. 3, with continued reference to FIG. 2. As shown, a turbine stage 100 includes an array of airfoils 10 extending radially outward from an inner endwall 20. Each of the airfoils 10 is formed by a concave pressure side surface 12 and a laterally opposite convex suction side surface 14, which extend between a leading edge 16 and a trailing edge 18. A flow passage 50 is defined between a first airfoil 10a and a circumferentially adjacent second airfoil 10b.

Referring to FIG. 3, the axial position 0% $Cax_{ID}$ may be defined as a leading edge position of the airfoils 10 on the inner endwall 20 along the axial direction A. The axial position 100% $Cax_{ID}$ may be defined as a trailing edge position of the airfoils 10 on the inner endwall 20 in the axial direction A. At any given axial position, the circumferential position 0% $pitch_{ID}$ may be defined as a first position on the inner endwall 20 at a pressure side surface 12 of a first airfoil 10a. he circumferential position 100% $pitch_{ID}$ may be defined as a second position on the inner endwall 20 at a suction side surface 14 of the circumferentially opposite second airfoil 10b, which directly faces said first position at the pressure side surface 12 of the first airfoil 10a in the circumferential direction C.

In the illustrated embodiment, the inner endwall 20 is non-axisymmetric, comprising a mid-passage bulge 22 located between the adjacent airfoils 10a and 10b. A bulge may be understood to be a protrusion or a hill extending into the flow path in relation to the nominal endwall surface. A bulge may be formed as a convex surface. In FIG. 3, the bulge 22 is shown with positive isoclines of common elevation from an axisymmetric nominal surface 26 of the inner endwall 20. The bulge 22 has a peak 24 which defines a point of maximum height h (see FIG. 2) measured normally from the nominal surface 26 of the inner endwall 20. As per the illustrated embodiment, the peak 24 is located at or near the center of the flow passage 50 between adjacent airfoils 10a and 10b. In particular, the peak 24 may located at a position between 20-60% $Cax_{ID}$ and at a position between 30-70% $pitch_{ID}$.

In a further refinement the peak 24 of the bulge 22 may be located, in particular, at a position between 30-50% $Cax_{ID}$. In one embodiment, the peak 24 may located, in particular, at a position between 40-60% $pitch_{ID}$. The peak 24 of the bulge 22 may have a height h in the range of 3-8% of an axial chord length LID, measured normal to a nominal surface 26 of the inner endwall 20. The bulge 24 may be preferably spaced from the suction side surface 14 of the second airfoil 10b. That is, from the peak 24, the bulge 24 may slope toward the nominal surface 26 in a direction toward the suction side surface 14, merging with the nominal surface 26 at a distance from the suction side surface 14. In the shown embodiment, the bulge 22 is closer to the pressure side surface 12 than to the suction side surface 14. In some embodiments, the bulge 22 may be further spaced from the pressure side surface 12 of the first airfoil 10a. That is, from the peak 24, the bulge 24 may slope toward the nominal surface 26 in a direction toward the pressure side surface 12, merging with the nominal surface 26 at a distance from the pressure side surface 12.

The inventors have determined that a conical inner endwall 20 having large hill or bulge 22 at or near the center of the flow passage 50 between adjacent airfoils 10 (as opposed to being adjacent or close to the airfoils) provides increased flow acceleration in an otherwise annularly deaccelerating flow passage. Referring to FIG. 2, the increased flow acceleration and a reduced static pressure weakens the formation of the passage vortex 80' and pulls the vortex 80' down to a lower exit span (i.e., closer to the endwall 20), while also reducing the pressure gradient laterally across the flow passage 50.

Although the above described embodiments relate to stationary turbine vanes, aspects to the present invention may be applicable rotating turbine blades, especially to a row of blades having a conical hub side inner endwall.

Figure 4:
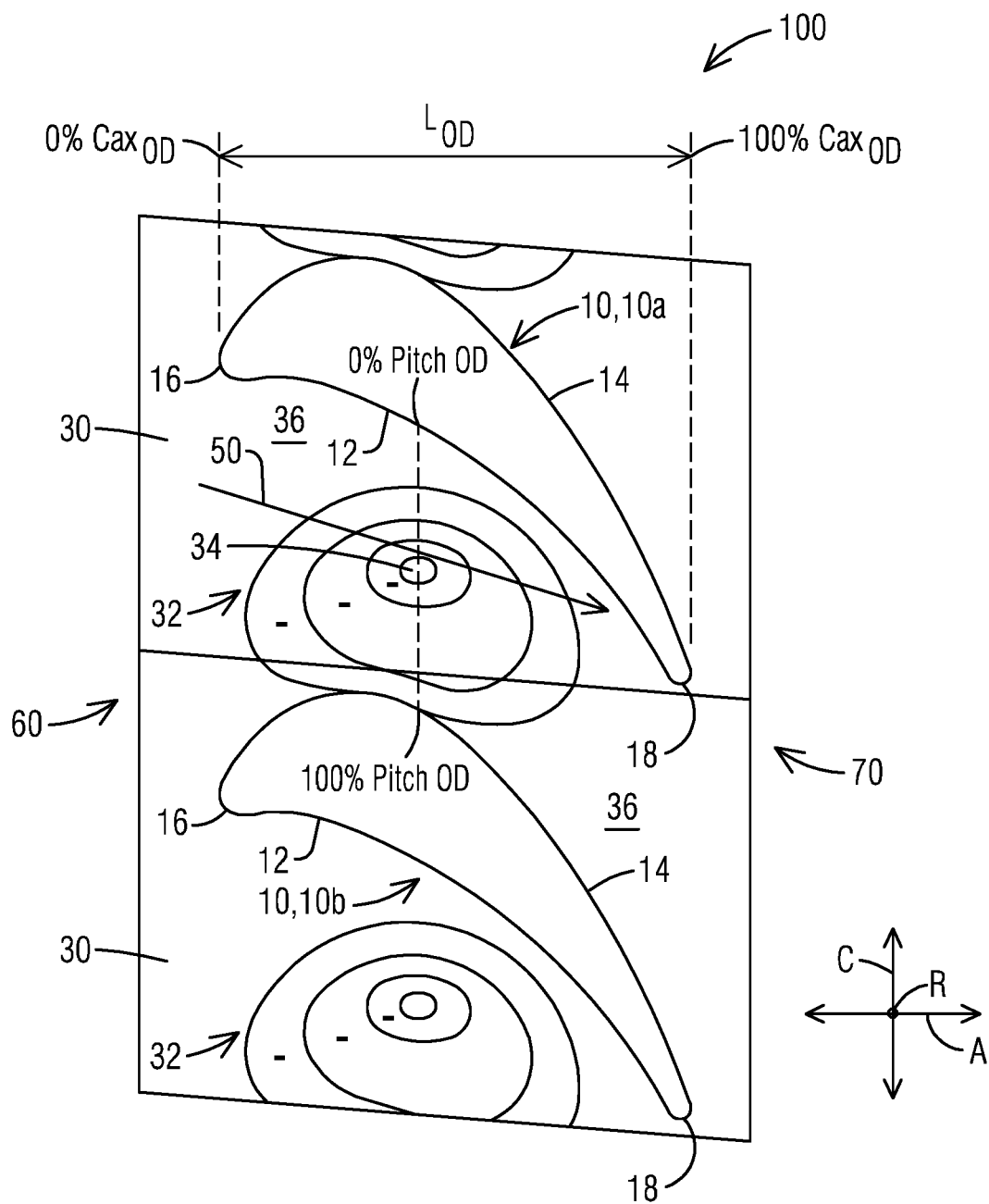
FIG. 4 illustrates a topography of a contoured conical outer endwall according to a further embodiment of the invention.

As shown in FIG. 2 and FIG. 4, in a further development, the inventors have determined that in case of the conical outer endwall 30, a corresponding effect of accelerating passage flow and weakening passage vortex may be achieved by providing a depression 32 on the outer endwall 30 at or near the center of the flow passage 50 between adjacent airfoils 10.

Referring to FIG. 4, the axial position 0% $Cax_{OD}$ may be defined as a leading edge position of the airfoils 10 on the outer endwall 30 along the axial direction A. The axial chord length on the outer endwall 30 is designated as $L_{OD}$. The axial position 100% $Cax_{OD}$ may be defined as a trailing edge position of the airfoils 10 on the outer endwall 30 in the axial direction A. At any given axial position, the circumferential position 0% $pitch_{OD}$ may be defined as a first position on the outer endwall 30 at a pressure side surface 12 of a first airfoil 10a. The circumferential position 100% $pitch_{OD}$ may be defined as a second position on the outer endwall 30 at a suction side surface 14 of the circumferentially opposite second airfoil 10b, which directly faces said first position at the pressure side surface 12 of the first airfoil 10a in the circumferential direction C.

In the illustrated embodiment, the outer endwall 30 is non-axisymmetric, comprising a mid-passage depression 32 located between the adjacent airfoils 10a and 10b. A depression may be understood to be a valley extending away the flow path in relation to the nominal endwall surface. A depression may be formed as a concave surface. In FIG. 4, the depression 32 is shown with negative isoclines of common elevation from an axisymmetric nominal surface 36 of the outer endwall 30. The depression 32 has a bottom point 34 which defines a point of maximum depth d (see FIG. 2) measured normally from the nominal surface 36 of the outer endwall 30. As per the illustrated embodiment, the bottom point 34 is located at or near the center of the flow passage 50 between adjacent airfoils 10a and 10b. In particular, the bottom point 34 may be located at a position between 20-60% $Cax_{OD}$ and at a position between 30-70% $pitch_{OD}$. Preferably, the depression 32 may be spaced from the pressure side surface 12 of the first airfoil 10a. That is, from the bottom point 34, the depression 32 may slope toward the nominal surface 36 in a direction toward the pressure side surface 12, merging with the nominal surface 36 at a distance from the pressure side surface 12. In the shown embodiment, the depression 32 is closer to the suction side surface 14 than to the pressure side surface 12.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

The invention claimed is:

1. A turbine stage comprising:
an array of airfoils spaced apart circumferentially to define a flow passage therebetween for channeling a working medium, the airfoils extending radially outward from an inner endwall located at a hub side thereof,
wherein an axial position 0% $Cax_{ID}$ is defined as a leading edge position of the airfoils on the inner endwall in an axial direction of the stage, and an axial position 100% $Cax_{ID}$ is defined as a trailing edge position of the airfoils on the inner endwall in the axial direction of the stage from an upstream side to a downstream side,
wherein, at any given axial position, 0% $pitch_{ID}$ is defined as a first position on the inner endwall at a pressure side surface of a first airfoil, and 100% $pitch_{ID}$ is defined as a second position on the inner endwall at a suction side surface of a circumferentially adjacent second airfoil, which faces the first position at the pressure side surface of the first airfoil in a circumferential direction of the stage,
wherein the inner endwall is conical and inclined at an angle to an engine axis such that the flow passage is divergent from the upstream side to the downstream side,
wherein the inner endwall is non-axisymmetric about the engine axis, comprising a mid-passage bulge located between the first and second airfoils, the bulge having a peak at a position between 20-60% $Cax_{ID}$ and at a position between 30-70% $pitch_{ID}$,
wherein the bulge is a protrusion that extends into the flow passage in relation to the inner endwall, and
wherein the inner endwall extends from an upstream side of the inner endwall to the bulge and from the bulge to a downstream side of the inner endwall and cooperate with the bulge to define an entire portion of the inner endwall in the flow passage to increase flow acceleration in the flow passage.

2. The turbine stage according to claim 1, wherein the peak of the bulge is located at a position between 30-50% $Cax_{ID}$.

3. The turbine stage according to claim 1, wherein the peak of the bulge is located at a position between 40-60% $pitch_{ID}$.

4. The turbine stage according to claim 1, wherein the peak of the bulge has a height in the range of 3-8% of an axial chord length, measured normal to a nominal surface of the inner endwall.

5. The turbine stage according to claim 1, wherein the bulge is spaced from the suction side surface of the second airfoil.

6. The turbine stage according to claim 1, wherein the inner endwall is inclined toward the engine axis in a direction from the upstream side to the downstream side, the angle of inclination of the inner endwall in relation to the engine axis is in the range between 5-25 degrees.

7. The turbine stage according to claim 1, further comprising an outer endwall located at a tip side of the array of airfoils,
wherein an axial position 0% $Cax_{OD}$ is defined as a leading edge position of the airfoils on the outer endwall in the axial direction of the stage, and an axial position 100% $Cax_{OD}$ is defined as a trailing edge position of the airfoils on the outer endwall in the axial direction of the stage from the upstream side to the downstream side,
wherein, at any given axial position, 0% $pitch_{OD}$ is defined as a first position on the outer endwall at the pressure side surface of the first airfoil, and 100% pitch$_{OD}$ is defined as a second position on the outer endwall at the suction side surface of the second airfoil, which faces the first position at the pressure side surface of the first airfoil in the circumferential direction of the stage, wherein the outer endwall is inclined at an angle to the engine axis such that the flow passage is divergent from the upstream side to the downstream side, and wherein the outer endwall is non-axisymmetric about the engine axis, comprising a mid-passage depression located between the first and second airfoils, depression having a bottom point at a position between 20-60% Cax$_{ID}$ and at a position between 30-70% pitch$_{ID}$.

8. The turbine stage according to claim 7, wherein the depression is spaced from the pressure side surface of the first airfoil.

9. The turbine stage according to claim 7, wherein the angle of inclination of the inner endwall in relation to the engine axis is shallower than the angle of inclination of the outer endwall in relation to the engine axis.

10. The turbine stage according to claim 7, wherein the outer endwall is inclined away from the engine axis in a direction from the upstream side to the downstream side, the angle of inclination of the outer endwall in relation to the engine axis is in the range between 10-45 degrees.

11. The turbine stage according to claim 1, wherein the array of airfoils is part of a row of stationary turbine vanes.

12. The turbine stage according to claim 1, wherein the array of airfoils is part of a row of rotating turbine blades.

* * * * *